May 30, 1967 J. J. BUNDSCHUH Re. 26,214

PHOTOGRAPHIC FLASH UNIT

Original Filed Feb. 28, 1963

JOHN J. BUNDSCHUH
INVENTOR.

BY R. Frank Smith

Paul A. Sperry

ATTORNEYS

United States Patent Office

Re. 26,214
Reissued May 30, 1967

26,214
PHOTOGRAPHIC FLASH UNIT

John J. Bundschuh, Penfield, N.Y., assignor to Eastman Kodak Company, Rochester, N.Y., a corporation of New Jersey Original No. 3,184,584, dated May 18, 1965, Ser. No. 261,661, Feb. 28, 1963. Application for reissue June 14, 1966, Ser. No. 562,973
Claims priority, application Germany, Aug. 29, 1962, K 42,347
7 Claims. (Cl. 240—1.3)

Matter enclosed in heavy brackets [ ] appears in the original patent but forms no part of this reissue specification; matter printed in italics indicates the additions made by reissue.

This invention relates to a mechanism for a photographic flash unit. More particularly, this invention relates to such a flash unit incorporating mechanism which alternatively releases a hinged reflector or a flash bulb.

Cameras adapted to expose photo-sensitive film indoors are commonly provided with a flash lamp unit which includes a suitable reflector, a lamp socket, a power supply and an electric circuit to fire a flash type lamp bulb inserted into the lamp socket.

It is an object of my invention to provide such a flash unit having a retractable reflector and wherein a single release member is operable both to release the reflector from its inoperative position and to release the base of a flash bulb from the lamp socket.

Other objects and a further understanding of the invention can be had by referring to the following description and claims taken in conjunction with the accompanying drawings in which:

In order to facilitate a clearer understanding of the novel release mechanism, a brief summary will be helpful. A hinged top cover which includes a reflector is mounted on the top wall of the camera and is spring biased for pivotal movement to an operative position. The camera is provided with a manually operable spring biased member, one portion of which serves as a latch for the cover and another portion of which carries a detent for holding the base of the flash bulb in the lamp socket so that the one member controls the release of both the cover and the flash bulb.

Figure 1:
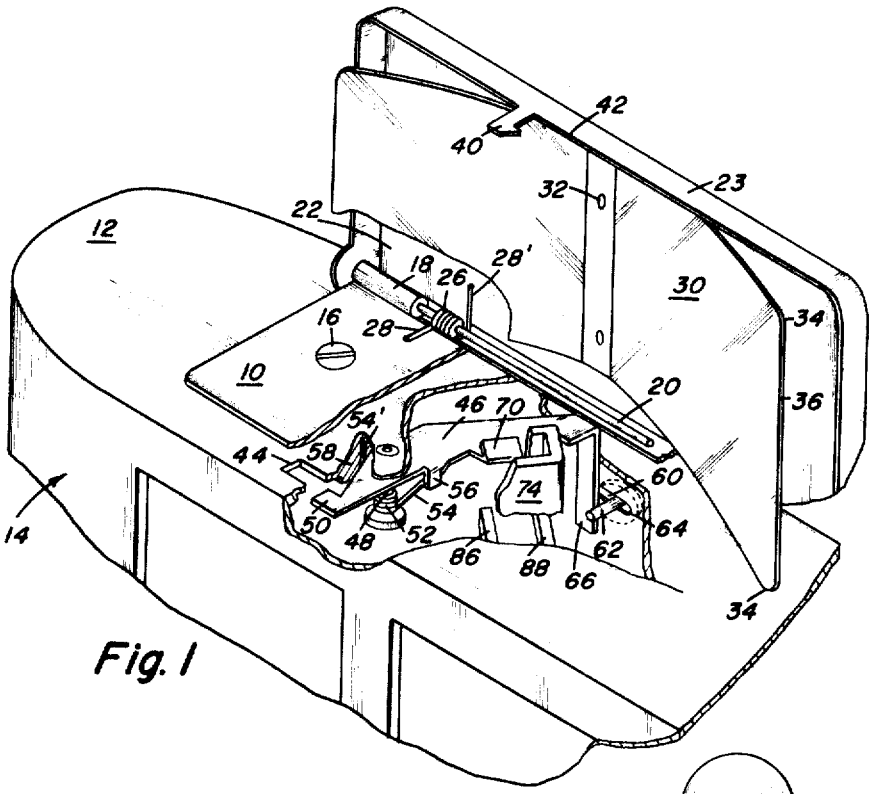
FIG. 1 is a partial perspective view, partly in section, of a camera incorporating my invention.

Referring more particularly to FIG. 1, a hinge plate 10 is fastened to the top wall 12 of the camera body 14 by any suitable means such as screw 16. A pair of bearing members 18 (only one of which is shown) are formed at one edge of hinge plate 10 for the purpose of supporting a shaft 20 extending therebetween. A cover 22 having a skirt 23 is secured to shaft 20 for pivotal movement relative to top wall 12 of camera body 14. A coiled torsion spring 26 whose opposite ends 28 and 28' engage hinge plate 10 and cover 22, respectively, tends to urge cover 22 in a clockwise direction about shaft 20 and to a raised position, as viewed in FIG. 1. A reflector 30 formed of a curved resilient material, such as spring steel buffed on one side to obtain a highly reflective surface, is fastened at its mid point to the cover 22 by any suitable means, such as spot welds 32. Reflector 30 is slightly bowed so that it tends to form a substantially parabolic reflecting surface. The corners 34 of the peripheral edge 36 of reflector 30 are preferably rounded off to prevent the reflector from scratching the top surface of hinged plate 10 when cover 22 is moved to its open or closed position.

A projection or latch 40 formed in the edge 42 of skirt 23 is adapted to extend through an aperture 44 located in the top wall 12 of the camera body when the cover is closed. A lever 46, pivotally mounted on a pin 48 which projects from the bottom surface of wall 12, has a tab or keeper 50 located at one end adapted to coact with the latch 40 when the cover is in the closed position. A coiled spring 52 having opposite ends 54 and 54' is mounted on pin 48. End 54 of spring 52 engages a downwardly depending projection 56 of lever 46; whereas, end 54' engages projection 58 depending from wall 12. Lever 46 is thus urged in a clockwise direction about pin 48, as viewed in FIG. 1.

A control button 60 slidably mounted on the rear wall of camera body 14 has a pin 62 which projects through a slot 64 in the rear wall of camera body 14 and operatively engages a depending tab 66 formed on lever 46. Due to the clockwise force exerted by spring 52 on lever 46, tab 66 is urged into engagement with pin 62 of button 60.

Figure 3:
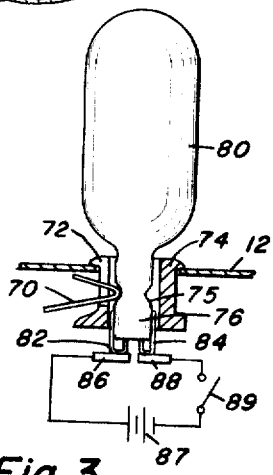
FIG. 3 is a side view, partly in section, diagrammatically showing the electric circuit and lamp socket of FIGS. 1 and 2 with a flash bulb inserted therein.

As best shown in FIGS. 1 and 3, a V-shaped detent 70, integrally formed on one edge of lever 46 intermediate projection 56 and tab 66, is positioned to move through a slot 72 in one wall of lamp socket 74 which is mounted on wall 12. Detent 70 engages a recess 75 in the base 76 of a flash-type lamp bulb 80. Spring contacts 86 and 88 which are suitably mounted on camera body 14 and positioned beneath lamp socket 74, are slidably engaged and depressed by terminals 82 and 84 of flash bulb 80.

The operation of the novel release mechanism can best be described starting with cover 22 initially in its inoperative position, wherein cover 22 is displaced about shaft 20 in a counterclockwise direction substantially 90° from its position shown in FIG. 1, such that latch 40 extends through aperture 44. Keeper 50 on spring biased lever 46 cooperates with latch 40 to retain cover 22 in this inoperative position. With cover 22 in its inoperative position, the edges 36 of reflector 30 will bear against the surface of hinge plate 10; and, because of the resilient material from which it is formed, reflector 30 will be flattened somewhat and enclosed within the recess formed by skirt 23 of cover 22. When the operator moves control button 60 to the left, as shown in FIG. 1, pin 62 will engage tab 66 and rotate lever 46 about pin 48 in a counterclockwise direction to move keeper 50 out of engagement with latch 40. The compression force of spring 26 moves cover 22 in a clockwise direction about shaft 20 until skirt 23 of cover 22 engages top wall 12 of camera body 14 to prevent further movement. The general plane of cover 22 will now be positioned substantially at a right angle to the plane of top wall 12, as shown in FIG. 1. Simultaneous with the movement of cover 22 to its vertical position, reflector 30 is released and moves to its operative position in which the buffed surface of the reflector, due to its resilience, tends to form a parabolic reflecting surface.

When the operator releases control button 60, spring 52 urges lever 46 in a clockwise direction about pin 48 and V-shaped detent 70 again moves into slot 72 in lamp socket 74. Insertion of the base 76 of a flash lamp 80 into lamp socket 74 will cam lever 46 in a counterclockwise direction about pin 48 against the bias of spring 52. The terminals 82 and 84 of lamp 80 engage spring contacts 86 and 88, respectively, to electrically connect the lamp bulb in series with the electrical power source 87 as diagrammatically indicated in FIG. 3. The switch 89 of the electrical circuit is closed in any known manner such as by a shutter-actuated trip (not shown) so as to fire the bulb 80 when the shutter is opened for the taking of an exposure.

Once an exposure is made, and lamp bulb 80 has been fired, it is necessary to remove the used lamp bulb from the lamp socket 74. To do this, the operator merely again moves control button 60 to the left, as viewed in FIG. 1, thereby moving tab 66 to rotate lever 46 in a counterclockwise direction about pin 48 and move V-shaped detent 70 out of slot 72 of lamp socket 74. Spring contact arms 86 and 88 then act on base 76 of lamp bulb 80 to eject the bulb from lamp socket 74.

Once lamp bulb 80 is ejected from lamp socket 74, cover 22 including reflector 30 can be pivoted about shaft 20 with latch 40 camming lever 46 in a counterclockwise direction about pin 48 until keeper 50 is reengaged to lock the cover in its closed position.

Figure 2:
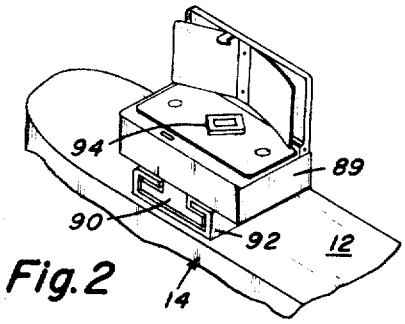
FIG. 2 is a perspective view of a flash accessory mounted on the top of a camera.

FIG. 2 shows another embodiment wherein my invention is applied to a camera flash attachment which is separable from the camera, rather than being a part of the camera itself. In this form the reflector, lamp socket, latch, release button, etc. are carried by a member 89 having a T-shaped shoe 90 which can be inserted into a U-shaped shoe receiving member 92 secured to the top wall 12 of the camera body 14.

When the socket is fully inserted into shoe 92, suitable electrical connections (not shown) are closed so that contacts of the lamp socket 94 will be in electrical circuit with suitable flash control circuitry in the camera.

The invention has been described in detail with particular reference to the preferred embodiment thereof, but it will be understood that variations and modifications can be effected within the spirit and scope of the invention as described hereinabove and as defined in the appended claims.

I claim:

1. A photographic flash unit comprising:

(a) a support;

(b) a lamp socket mounted on the support for releasably accepting the base of a flash lamp;

(c) a reflector, including a latch, hingedly mounted on the support and movable between an inoperative position and an operative position;

(d) a member, including a keeper and a lamp retention detent, mounted on said support for movement between a first position, in which said keeper is in position to engage said latch of said reflector when said reflector is in said inoperative position and said lamp detent is in position to engage the base of a flash lamp in said lamp socket and a second position, in which said keeper releases said latch of said reflector to allow said reflector to move to said operative position and said lamp detent is moved out of engagement with the base of said lamp to permit removal of said lamp from said lamp socket; and (e) control means for moving said member between said first and second positions.

2. The photographic flash unit of claim 1 wherein said member is an elongated lever pivotally mounted on said support, said keeper being formed on one end of said lever for movement therewith in a plane substantially perpendicular to the plane of movement of said latch on said hinged reflector, and said lamp retention detent being formed on an intermediate portion of said lever for movement in a plane substantially transverse to the central axis of said lamp socket.

3. A photographic flash unit comprising:

(a) a support;

(b) a lamp socket mounted on one wall of said support for releasably accepting the base of a flash lamp;

(c) a substantially flat cover including a skirt and a latch hingedly mounted on said support for movement between a closed position, in which said cover conceals said lamp socket, and an open position, in which said cover is positioned substantially parallel to the central axis of said lamp socket to expose said lamp socket;

(d) a curved reflector secured to said cover for movement therewith, said reflector being accommodated within the confines of said skirt when said reflector is in said closed position;

(e) a lever, including a keeper and a lamp retention detent, mounted on said support for movement between a first position, in which said keeper is in position to engage said latch of said cover when said cover is in said closed position and said lamp detent is in position to engage the base of a lamp in said lamp socket, and a second position in which said keeper releases said latch of said cover to allow said cover to move to said open position and said lamp detent is held out of engagement with the base of said lamp to permit removal of said lamp bulb from said lamp socket;

(1) said keeper being formed in one end of said lever for movement therewith in a plane substantially perpendicular to the plane of movement of said latch;

(2) a slot formed in one wall of said lamp socket, and (3) said lamp retention detent being a V-shaped member formed in one edge of said lever and projecting into said slot of said lamp socket to engage the base of a flash lamp when said lever is in said first position; and (f) a control button slidably mounted on said camera body and operatively connected to said lever for moving said lever between said first position and said second positions.

4. A flash unit as in claim 3 wherein said cover is resiliently biased toward said open position and said lever is resiliently biased toward its first position.

*5. A photographic flash unit for use with a camera having a flash control circuit, the unit comprising:*

*(a) a support;*

*(b) a socket mounted on the support for accepting the base of an inserted flash device for illumination of the subject to be photographed upon actuation of the flash control circuit;*

*(c) a single cover-and-reflector member movably mounted on the support to move between a closed position, in which said member covers at least a portion of the socket, and an open position, in which said member uncovers the socket and places the reflector portion of said member in operative position to reflect light from a flash device inserted in the socket after said member has moved to such open position;*

*(d) means for retaining the cover-and-reflector member in its closed position;*

*(e) a single, manually operable control member movable from a first position to a second position; and*

*(f) release means interrelating the control member with the socket and with the cover-and-reflector member retaining means and which is effective, upon successive movements of the control member from its first position to its second position, for releasing the cover-and-reflector member from its closed position and for releasing a subsequently inserted flash device from the socket.*

*6. A photographic flash unit for use with a camera having a flash control circuit, the unit comprising:*

*(a) a support;*

*(b) a socket mounted on the support for accepting the base of an inserted flash device for illumination of the subject to be photographed upon actuation of the flash control circuit;*

*(c) a single cover-and-reflector member movably mounted on the support to move between a closed position, in which said member covers at least a portion of the socket, and an open position, in which*

*said member uncovers the socket and places the reflector portion of said member in operative position to reflect light from a flash device inserted in the socket after said member has moved to such open position;*

(*d*) *a single, manually operable control means movable from a first position to a second position; and*

(*e*) *a separate, single member cooperatively associated with the control means to effect, in turn, upon successive movements of the control means from its first position to its second position, (1) movement of the cover-and-reflector member from its closed position, and then, after the cover-and-reflector member has moved to its open position, (2) ejection of a subsequently inserted flash device from the socket.*

*7. A photographic flash unit for use with a camera having a flash control circuit, the unit comprising:*

(*a*) *a support;*

(*b*) *a socket mounted on the support for accepting the base of an inserted flash device for illumination of the subject to be photographed upon actuation of the flash control circuit;*

(*c*) *a single cover-and-reflector member movably mounted on the support to move between a closed position, in which said member lies in a plane transverse to the central axis of the socket and covers at least a portion of the socket, and an open position, in which said member lies in a plane substantially parallel with the central axis of the socket, uncovers the socket, and places the reflector portion of said member in operative position to reflect light from a flash device inserted in the socket after said member has moved to such open position;*

(*d*) *a single, manually operable control member movable from a first position to a second position for effecting thereby movement of the cover-and-reflector member from its closed position to its open position and ejection of a subsequently inserted flash device from the socket when the cover-and-reflector member is in its open position.*

References Cited

The following references, cited by the Examiner, are of record in the patented file of this patent or the original patent.

UNITED STATES PATENTS

| | | | |
|---|---|---|---|
| 2,780,720 | 2/1957 | Bertrams | 240—1.3 |
| 2,976,398 | 3/1961 | McKee et al. | 95—11.5 X |
| 3,069,649 | 12/1962 | Kotler et al. | 339—45 |
| 3,079,490 | 2/1963 | Barbieri | 240—1.3 |
| 3,204,542 | 9/1965 | Strasser et al. | 95—11 |

NORTON ANSHER, *Primary Examiner.*

F. L. BRAUN, *Assistant Examiner.*